Nov. 10, 1931.　　F. EICHLER ET AL　　1,830,987
FOLLOW-UP SYSTEM
Filed April 22, 1929　　2 Sheets-Sheet 1
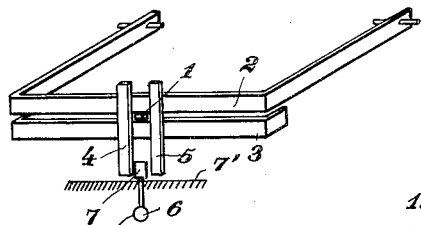
Fig. 1
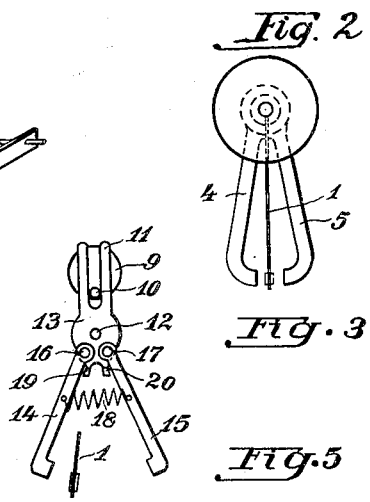
Fig. 2
Fig. 3
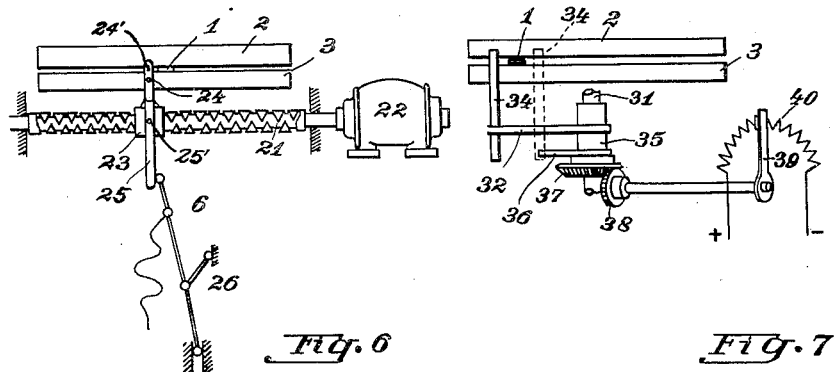
Fig. 4
Fig. 5
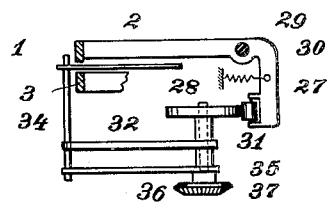
Fig. 6
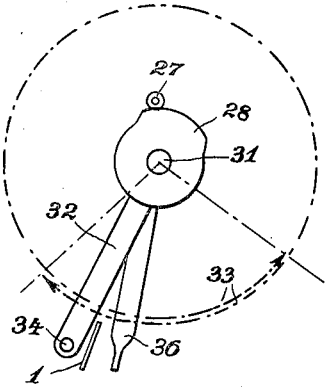
Fig. 7
Inventors:
Fritz Eichler
Heinz Grüss
Manfred Schleicher
by Lorka, Kehlenbeck & Farley
Attorneys.

Nov. 10, 1931.  F. EICHLER ET AL  1,830,987

FOLLOW-UP SYSTEM

Filed April 22, 1929   2 Sheets-Sheet 2

Inventors:
Fritz Eichler
Heinz Grüss
Manfred Schleicher
by Lotka, Kehlenbeck & Farley
Attorneys.

Patented Nov. 10, 1931

1,830,987

UNITED STATES PATENT OFFICE

FRITZ EICHLER, OF BERLIN, HEINZ GRÜSS, OF BERLIN-STAAKEN, AND MANFRED SCHLEICHER, OF BERLIN-CHARLOTTENBURG, GERMANY, ASSIGNORS TO SIEMENS & HALSKE, AKTIENGESELLSCHAFT, OF SIEMENSSTADT, NEAR BERLIN, GERMANY, A CORPORATION OF GERMANY

FOLLOW-UP SYSTEM

Application filed April 22, 1929, Serial No. 356,986, and in Germany April 24, 1928.

The mechanical displacement of any desired members depending on the adjustment of a measuring instrument by an inclined plane arranged along the path of the pointer, against which the pointer is pressed under the influence of an intermittently acting auxiliary force is known, see for instance Roucka's German Patent 379,194. In this the amount of the displacement which the inclined plane undergoes is used for the adjustment of the device to be controlled, for instance, an electrical contact.

This arrangement has as its main defect, the fact that a sliding of the pointer can take place on the inclined plane other than through the influence of the auxiliary force and thus an incorrect displacement of the device to be controlled be produced. Furthermore, said earlier construction requires the pointer to be movable in a direction perpendicular to its normal plane of movement, which is found from experience to be attended with great difficulties.

To avoid these defects the arrangement according to the invention is so contrived that two comparatively strong auxiliary forces act intermittently in different directions, preferably at right angles to each other in such a manner that by the combined action of these auxiliary forces a freely adjustable member, as for example, a spring pen or contact arm, is caused to follow the movement of the pointer. In this the pointer is suitably pressed against a fixed support by one auxiliary force exerted for instance, by an intermittently falling stirrup and during the period of rest the member to be adjusted is brought by the second perpendicularly directed auxiliary force into agreement with the position of the pointer so fixed.

Figure 8:
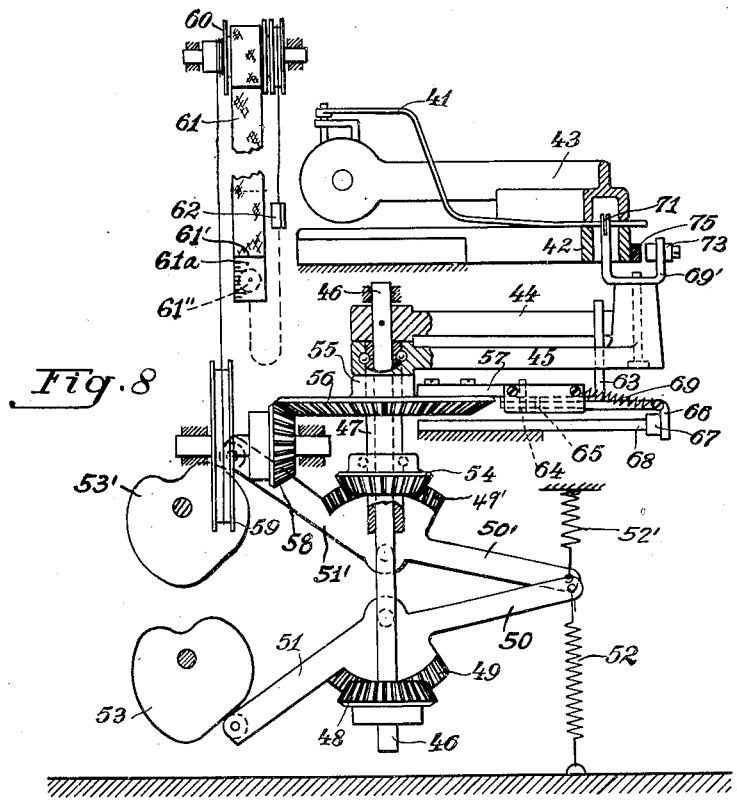
Figure 9:
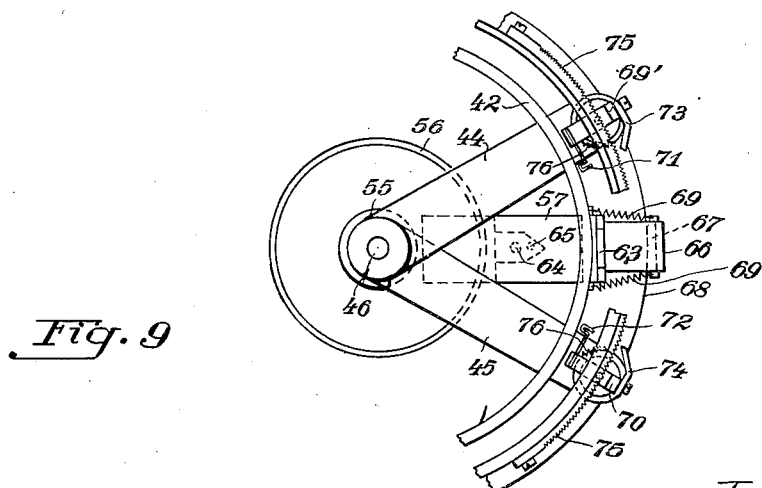

In the drawings several embodiments of the invention are shown. Figure 1 shows diagrammatically in front view a simple embodiment while Figures 2 and 3 show in top view two different forms of construction for one of the two auxiliary apparatuses shown in Figure 1. Figure 4 is a front view of another embodiment of the invention. A third embodiment is shown in Figures 5–7 in front view, side view or section as well as in top view over the most important parts. Figures 8 and 9 are a side elevation partly in section and a plan of a fourth embodiment of the invention; in Figure 9 only the essential parts of the setting device are shown.

In Figure 1 the pointer 1 of a measuring instrument is displaced underneath a drop stirrup 2, which intermittently throws the pointer down on to a fixed support 3. One auxiliary force is exerted by the stirrup 2. Two limbs 4 and 5 coupled together which intermittently open and close in the form of tongs as shown in Figure 2 are used for the production of the second auxiliary force. Between the two limbs 4 and 5 is arranged the device to be adjusted as, for example, a spring pen. The inking pen 6 shown in Figure 1 fixed to a body 7 which is adjustably arranged on a slide 7'.

The operation of the arrangement according to Figures 1 and 2 is as follows: when the pointer 1 is pressed against the fixed support 3 by the stirrup 2, the parts 4 and 5 move towards each other by means of any suitable actuating elements not shown. They carry the sliding body 7 and with it also the ink pen, with them in this movement until they meet with resistance at the tip of the pointer 1 which is clamped by the stirrup 2. The stirrup 2 then lifts up again while at the same time the two parts 4 and 5 again move from each other, so that the pointer 1 is free to adjust itself. These operations are then repeated so that the ink pen 6 produces a continuous curve 8.

Instead of the two parts 4 and 5 the arrangement shown in Figure 3 can be used. This contains a crank drive 9, the pin 10 of which engages in a slot of a forked member 11, which is mounted to rock about a spindle 12. The slotted member 11 is provided on a body 13 which also carries two levers 14, 15 pivoted at points 16, 17. Both these levers 14 and 15 are forced by the action of a spring 18 against two stop pins 19, 20. The front ends of the levers 14, 15 are bent over at a right angle similar to the parts 4, 5, so that they extend into the path of the pointer 1. By means of the crank drive 9 the two levers 14, 15 are rocked alternately to the left and the right. If the pointer 1 is pressed straight down by the drop loop 2, Figure 1, then one of the two levers 14, 15 carries the sliding body 7 with it until it is stopped by the pointer 1. By the action of the crank drive 9 the corresponding lever would then be generally carried a little farther in the same direction. As in consequence of stoppage by the pointer 1 lever cannot follow this drive, it will remain stationary but will not prevent the further movement of its driving body 13 as this is so connected with the lever 14 by means of the pin 16 and the spring 18 that a release of the two parts from each other takes place in the desired manner. The crank drive 13 then reverses its direction of movement and carries the adjusting lever 14 back with it, the sliding body or supplementary position indicator 7 remaining at its old position. By this action of the levers 14 and 15 the sliding body 7 and with it the ink pen 6 are caused to follow the pointer 1 continuously.

In Figure 4 a worm 21 with backward and forward thread is arranged underneath the path of the pointer and is driven by a clock work motor 22 or the like always in the same direction and at constant speed. On the worm 21 is arranged a nut 23 which by means of the rotation of the worm 21 moves backwards and forwards axially on the worm 21. On arriving at the end of the worm 21 the direction of movement is reversed by means of the double thread. The nut 23 carries the fulcrum 25' of a double armed lever 25, and also the fulcrum 24 of a double armed lever 24' of which the upper end can come into contact with the pointer 1, while the lower end has a pin-and-slot or other suitable connection with the upper end of the lever 25, the lower end of which displaces the member to be adjusted, for instance, again an inking pen 6 with guide bars 26 of a character well known in this art. Springs (not shown) or other suitable means tend to bring the levers 25, 24' to the aligning position illustrated. If for instance, the nut 23 moves to the right from the position shown in Fig. 4, the upper end of lever 24' will be stopped when it comes in contact with the stationary pointer 1 held down by the stirrup 2, and the further movement of the nut 23 toward the right will cause the lever 24' to swing contraclockwise on its fulcrum 24. The lever 25 is thereby swung clockwise on its fulcrum 25 and the pen 6, which up to that moment has been shifted toward the right by the lever 25, becomes stationary in a position corresponding to that of the pointer 1. The clockwise swinging of the lever 25 enables it to clear the temporarily stationary guide mechanism 26 of the pen 6, so that said lever will pass from the illustrated position at the left of said mechanism, to a position at the right thereof, as the nut 23 continues moving to the right. Similarly, the contraclockwise swinging of the lever 24' will enable it to clear the temporarily stationary pointer 1 during the continued movement of the nut 23 toward the right. This operation is repeated intermittently, the lever 24' engaging the temporarily stationed pointer first on one side and then on the other.

In the embodiment according to Figures 5 to 7 the pointer 1 is again intermittently pressed down by a stirrup 2 on to a fixed support 3. The movement of the stirrup 2 is effected through a small roller 27 carried at the lower end of a member extending at right angles to the loop of the stirrup, which roller is intermittently forced outwards by a cam disc 28. In this case the stirrup 2 rocks about the axis 29 against the action of the spring 30 and its front edge forces the pointer 1 on to the support 3. The cam disc 28 is fixed on a spindle 31 which also carries a lever 32. The movement of the spindle 31 is effected by the lever 32 passing over the angular path 33 shown in Figure 7 by the arrow head. The drive for the spindle can be effected, for example, by a driving mechanism constructed in the manner of the striking gear of a clock. The lever 32 carries at the front end a pin 34. A hollow spindle 35 is loosely fitted on the spindle 31 and on it is fixed a lever 36. The spindle 35 also carries a toothed wheel 37 which by means of a toothed wheel 38 can, for example, displace a contact arm 39 over a resistance 40. The rheostat 39, 40 serves to adjust any desired electrical measuring device corresponding to the position of the pointer 1. This adjustment takes place as follows: As already mentioned the pointer 1 is intermittently pressed down on to the support 3 by the stirrup 2 by means of the crank drive 28, 27. At the same time, by means of the spindle 31, on which the cam disc 28 is fastened, and which is rotated alternately in opposite directions, by more than a complete revolution, the lever 32 is displaced over the angular path 33, Figure 7, first in one and then in the other direction. By means of this displacement of the lever 32 its pin 34 meets the freely rotatable lever 36 and carries this with it until the upper end of the pin meets the pointer 1 held fast by the stirrup 2. By the movement of the lever 36 thus effected the contact arm 39 is displaced over the resistance 40 through the gear 35, 37, 38 so that it takes up a position corresponding to the position of the pointer 1. The arrangement must be so contrived that the force moving the lever 32 can be braked by the arrested pointer 1.

This can be effected, for example, by means of a friction gear or a motor which can be easily braked. The stirrup 2 then releases the pointer 1 and the lever 32 with its pin 34 again moves away from the pointer in order with the next following pressing down of the pointer 1 by the stirrup 2 to touch the pointer from the other side. In this the follower lever 36 is generally again carried on according to the displacement which the pointer 1 has in the meantime undergone.

The new apparatus is especially suitable for such measuring devices which work with comparatively weak adjusting forces. It can, however, be used for any other desired measuring devices. Furthermore, it does not matter what the character of the device to be adjusted may be. In addition to the ink pen shown, or a contact arm, a blind (blinker) or the like may be displaced in order to indicate the position of the pointer 1 by means of a ribbon-like light strip produced by this blind and a source of light, if necessary with the help of optical elements such as lenses. A special advantage of the arrangement is that the throw of the primary and mostly very sensitive measuring device, may be as strongly amplified as desired.

A preferred form of the new arrangement is shown in Figures 8 and 9, in which a light hand is to be adjusted in dependence on the deflections of the pointer of a measuring instrument.

In Figure 8 the measuring instrument hand 41 moves over a fixed support 42 and is periodically pressed against the said support by a falling bracket 43. The two levers 44 and 45 which grip the hand 41 like a pair of tongs, are secured to spindles 46 and 47 respectively. To the spindle 46 is moreover keyed a gear wheel 48 which meshes with a toothed quadrant 49. To the toothed quadrant 49 are rigidly secured two arms 50 and 51, one of which is controlled by a spring 52, whilst the other arm 51 slides on a cam disc 53.

To the spindle 47 is also keyed a gear wheel 54 which is connected to similar driving organs as described for the gear wheel 48. That is to say, the wheel 54 meshes with a toothed quadrant 49', connected rigidly with two arms 50', 51', one of which is controlled by a spring 52', while the other engages a cam disc 53'. The cam discs 53 and 53' are rotated by a continuously working motor. Accordingly the two levers 44 and 45 will have a reciprocating or oscillating movement, moving first simultaneously towards the hand 41 and thereupon moving again away from the hand 41.

On the spindle 47 is further mounted freely the sleeve 55 for a gear wheel 56 to which is secured the member 57 which is to follow the movements of the hand. The member 57 is constantly caused to follow the hand 41 by the action of the levers 44 and 45 in co-operation with the falling bracket 43. The arrangement so far described is substantially the same as regards its construction and working, as the arrangement according to Figs. 1 to 7.

According to the invention, the gear wheel 56 meshes with a gear wheel 58 which, by means of the belt drive 59, drives the storage roll 60 for the covering band or shutter 61. The covering band 61 is movable behind a window 61' of glass or the like, of rectangular shape which moreover is artificially lighted from the back in any suitable manner, as by an electric bulb 61''. On or near the said window may be provided a graduation or scale 61ª.

In order to prevent the covering band from unwinding under the action of gravity, it is advisable to provide for it a balance weight 62, the suspension cord of which may be combined, if desired, to an endless band with the covering band. Moreover, wrong setting of the band 61 might be caused by accidental movements of the lever 57. To avoid this, the front end 63 of the lever 57 is mounted to rock about a pin 64. To the front end 63 of the lever 57 is connected, by means of a pin coupling 65, an arm 66 which carries a brake block 67. In the position of rest, the brake block 67 engages with a fixed brake segment 68 under the action of a spring 69. The pin of the coupling 65 engages with a practically triangular recess of the arm 66. Owing to the action of the brake 67, 68 any undesired movement of the lever 57, 63 is precluded. In Figure 9 the parts 41, 43, 48—54 and 58—62 are not shown.

Now, when one of the two constantly reciprocating levers 44 and 45 strikes the front end 63 of the lever 57, said end 63 will be turned about the pin 64 in opposition to the action of the spring 69. The pin of the coupling 65 will in that case actuate the arm 66 and thereby disengage the brake block 67 from the brake segment 68, so that the arm 57, and therefore, through the gear 55, 56, 58, 59, the covering band 61, will take part in the movement.

With such an arrangement it might happen in certain circumstances that, in the event of an excessively strong impact of one of the levers 44 and 45 against the hand 41 which is pressed firmly against the support 42 by the falling bracket 43, the said hand will be moved and therefore a wrong setting of the covering band 61 will take place. To avoid this, the impact of the two levers 44 and 45 against the hand 41 takes place elastically or resiliently.

The two levers 44 and 45 are controlled as already stated in their impact against the hand, not by the cam disc 53 and the corresponding cam disc, but by the springs 52 and 52' alone. Moreover there is also provided a brake device for the levers 44, 45.

To that end, the free end of each of the levers carries an angle iron 69' or 70 respectively pivoted about a vertical axis. On the angle irons 69' and 70 are arranged, for contact with the hand 41, spring blades 71, 72, whilst to the other branches of the angle irons are secured locking pawls 73 and 74.

When one of the spring blades 71 or 72 strikes the measuring instrument hand 41 which is at this moment just being pressed by the falling bracket 43 against the support 42, there will take place a slight turning of the angle irons 69' and 70. Accordingly, the locking pawl 73 or 74 will engage with teeth 75 secured to the support 42, and thereby prevent any further movement of the lever 44 or 45 in the direction towards the hand. On the direction of movement of the levers 44 and 45 being reversed, the locking pawl 73 or 74 will be again automatically disengaged from the teeth 75 owing to the action of the spring 76.

The arrangements described make it possible to ensure an absolutely reliable and accurate setting of the covering band 61 in accordance with the position of the hand 41.

In order to make the whole arrangement easily accessible, it is advisable to arrange the measuring instrument as well as the levers co-operating with it and the gear wheels for the driving of the cord pulley 59, close to the ground, and the storage drum 60 in a raised position.

The arrangement of the setting lever is preferably used also in other cases for the operation of large shutters for light hand instruments, or also for the operation of large and heavy hands, when the torque of the original measuring instrument is insufficient for the operation of such devices.

We claim:—

1. A device of the class described, comprising a movable element to be followed up, a follow-up element movable to positions corresponding to those assumed by the first-mentioned movable element, an intermittently movable device for temporarily arresting said first-mentioned element, another intermittently-acting device movable in a direction at an angle to the path of said first-mentioned device, and arranged to engage and shift said follow-up element to a position corresponding to that in which the other element is held by said arresting device.

2. A device according to claim 1, in which the device which shifts the follow-up element is arranged to engage the other movable element.

3. A device according to claim 1, in which the arresting device is arranged to press the first-mentioned movable element against a stationary support.

4. A device according to claim 1, in which the arresting device moves substantially at right angles to the path of the first-mentioned movable element and is arranged to press said element against a stationary support.

5. A device according to claim 1, in which the path of the arresting device is substantially at right angles to the path of the other intermittently-acting device.

6. A device of the class described, comprising a movable element to be followed up, a support adjacent to the path of said element, an arresting member movable transversely of said path, to press said element against said support, a follow-up element mounted to rock in a plane parallel to the path of said first-mentioned element, and lever mechanism, likewise mounted to rock in a plane parallel to said path, and arranged to engage and shift said follow-up element to a position corresponding to that in which the other element is held by said arresting member.

7. A device according to claim 6, in which the lever mechanism comprises two levers arranged on opposite sides of the follow-up element.

8. A device according to claim 6, in which the lever mechanism comprises two levers arranged on opposite sides of the follow-up element, and means for oscillating said levers into contact with the follow-up element.

9. A device according to claim 6, in which there is provided an illuminated scale, a shutter movable relatively to said scale, and an operative connection for transmitting movement from said follow-up element to said shutter.

10. A device according to claim 6, in which the lever mechanism comprises two levers arranged on opposite sides of the follow-up element, and means for oscillating said levers into contact with the follow-up element, and in which there is provided an illuminated scale, a band-like shutter movable relatively to said scale, and an operative connection for transmitting movement from said follow-up element to said shutter.

11. A device according to claim 6, in which a brake device is provided to co-operate with the follow-up element and prevent accidental movement thereof.

12. A device according to claim 6, in which the lever mechanism comprises two levers arranged on opposite sides of the follow-up element, and means for oscillating said levers into contact with the follow-up element, and in which a brake device is provided to co-operate with said follow-up element and hold the same against movement except when engaged by one or the other of said levers.

13. A device according to claim 6, in which the lever mechanism comprises two levers arranged on opposite sides of the follow-up element, and means for oscillating said levers into contact with the follow-up element, and in which there is provided an illuminated scale, a band-like shutter movable adjacent to said scale, an operative connection for transmitting movement from said follow-up element to said shutter, and a brake device co-operating with said follow-up element to hold the same against movement except when engaged by one or the other of said levers.

14. A device according to claim 1, in which the follow-up element has a spring-presesd pivoted end portion provided with a brake block, a stationary member co-operating with such brake block, and means on the device which shifts the follow-up member, for swinging said brake block into releasing position.

15. A device according to claim 1, in which the follow-up element has a spring-pressed pivoted end portion provided with a brake block, a stationary member co-operating with such brake block, means on the device which shifts the follow-up member, for swinging said brake block into releasing position, an illuminated scale, a band-like shutter movable relatively to said scale, and an operative connection for transmitting movement from said follow-up element to said shutter.

16. A device according to claim 1, in which there is provided a brake device to co-operate with the follow-up element and prevent accidental movement thereof, and a second brake device for stopping the movement of the device which shifts the follow-up element.

17. A device according to claim 6, in which the lever mechanism comprises two levers arranged on opposite sides of the follow-up element, means for oscillating said levers into contact with said follow-up element, a brake device co-operating with such follow-up element to hold the same against movement except when engaged by one or the other of said levers, a second brake device for stopping the movement of the device which shifts the follow-up element, an illuminated scale, a band-like shutter movable relatively to said scale, and an operative connection for transmitting movement from said follow-up member to said shutter.

18. A device according to claim 6, in which the lever mechanism comprises two levers arranged on opposite sides of the follow-up element, and means for oscillating said levers into contact with such element, and in which said follow-up element has a spring-pressed pivoted end portion provided with a brake block, and a stationary member co-operating with said brake block, said levers being arranged to engage the pivoted end portion of the follow-up element and swing the brake block into releasing position.

19. A device according to claim 6, in which the lever mechanism comprises two levers arranged on opposite sides of the follow-up element, and means for oscillating said levers into contact with such element, and in which said follow-up element has a spring-pressed pivoted end portion provided with a brake block, and a stationary member co-operating with said brake block said levers being arranged to engage the pivoted end portion of the follow-up element and swing the brake block into releasing position, and another brake device for stopping the movement of the device which shifts the follow-up element.

20. A device according to claim 1, in which the device which shifts the follow-up element comprises an oscillating member arranged to engage the said follow-up element and the other movable element alternately on opposite sides.

21. A device according to claim 1, in which there is provided an illuminated scale, a band-like shutter movable relatively to said scale, an operative connection for transmitting movement from said follow-up element to said shutter, a storage roll on which said band-like shutter is adapted to wind, and a balance weight connected with said shutter.

22. A device according to claim 1, in which the device which shifts the follow-up element comprises oscillating levers, cam means for operating the same, and spring-pressed members interposed between said cam means and the oscillating levers, to establish a yielding connection between them.

23. A device according to claim 1, in which there is provided an illuminated scale, a band-like shutter movable relatively to said scale, and an operative connection for transmitting movement from said follow-up element to said shutter, said scale and shutter being arranged at a higher level than the follow-up element and the other movable element, to render said elements readily accessible.

In testimony whereof we affix our signatures.

MANFRED SCHLEICHER.
FRITZ EICHLER.
HEINZ GRÜSS.